UNITED STATES PATENT OFFICE.

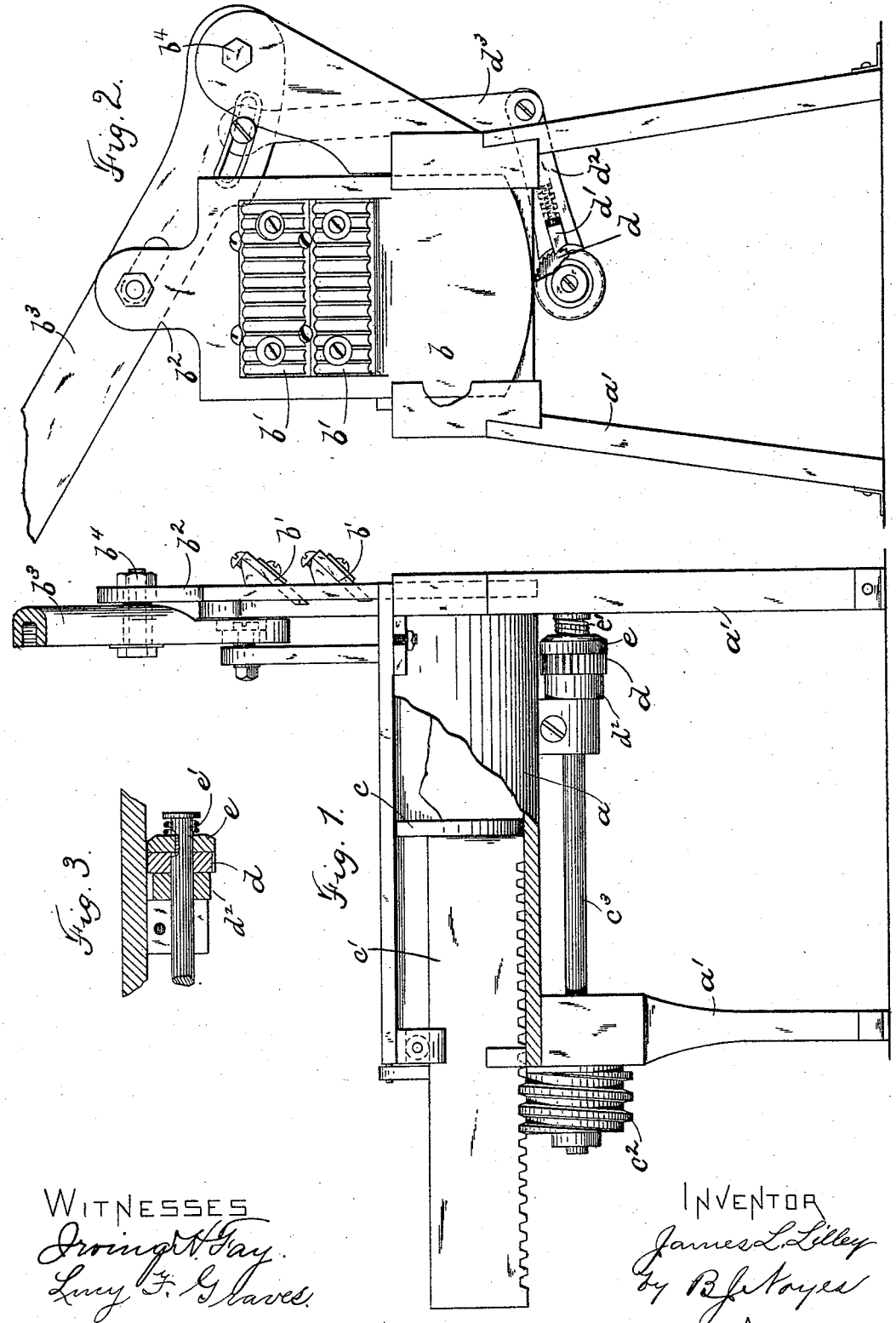

JAMES L. LILLEY, OF MILFORD, MASSACHUSETTS, ASSIGNOR TO F. W. MANN, OF SAME PLACE.

BONE-CUTTING MACHINE.

SPECIFICATION forming part of Letters Patent No. 498,398, dated May 30, 1893.

Application filed March 7, 1892. Serial No. 423,977. (No model.)

*To all whom it may concern:*

Be it known that I, JAMES L. LILLEY, of Milford, county of Worcester, State of Massachusetts, have invented an Improvement in Bone-Cutting Machines, of which the following description, in connection with the accompanying drawings, is a specification, like letters on the drawings representing like parts.

In bone cutting machines heretofore made, so far as I am aware, the bones to be cut or planed off, are placed in a receiver across the open or discharging end of which a knife is moved. A plunger or follower is contained in said bone receiver which presses the material against the knife carrying frame, said follower being fed forward in some instances manually as required, and in other instances intermittingly but positively. The material which is placed in the bone receiver to be cut up for poultry food varies greatly, it containing exceedingly hard pieces of bone, as well as softer pieces of bone, and even gristle and meat, and when the plunger forces the soft material against the knife carrying frame, said material is compressed and forced or crowded more or less into and through the clearance-slots for the knives, so that whenever the knives are depressed a larger quantity of the material is removed, than if the material which is pressed against the knife carrying frame should be hard, as in such latter event no part of the material can be forced or crowded into or through the clearance-slots, nor can it be compressed. Hence to fulfill the requirements the plunger or follower should be moved intermittingly irregular distances, according to the quantity of material which has just previously been removed by the knives.

This invention therefore, has for its object to improve and simplify the construction of bone cutting machines, and in providing a friction or slip feed mechanism for the follower or plunger, so that it may be advanced intermittingly irregular distances, according to the irregular quantities of the material removed by the knives.

Figure 1, shows in side elevation and partial section, a bone cutting machine embodying this invention, the handle being broken off to save space; Fig. 2, a right hand end view of Fig. 1; Fig. 3, a sectional detail of a part of the feeding mechanism.

The receiver $a$, herein represented as horizontally arranged and supported on legs or end frames $a'$, $a'$, is open at the front end, and a knife carrying frame $b$, movable vertically in suitable guideways formed in the end frames moves across or over said open end, it having two parallel slots cut through it, through which project the cutting edges of the knives $b'$, $b'$, adjustably secured to said frame, said slots being of sufficient size to afford ample clearance below the knives. One of the knives is made to project a little farther through its slot than the other knife, so that the two knives will cut in different vertical planes.

Instead of providing two knives as shown, I may provide any suitable number, or so far as other features on my invention are concerned one only may be employed.

The knife carrying frame $b$, is connected by a rod $b^2$, with a lever $b^3$, pivoted at $b^4$, to a suitable standard erected on the frame-work; the connection being sufficiently loose so that as the lever is operated, the knife carrying frame will be moved vertically. In lieu of said hand lever any other suitable operating device may be employed.

A follower $c$, of suitable shape to snugly fit yet slide freely within the bone containing receiver $a$, is attached to a rack bar $c'$, adapted to move longitudinally in suitable guideways; and a worm $c^2$, engages and moves said rack bar which is secured to the shaft $c^3$, having its bearings in the frame-work. A ratchet wheel $d$ is loosely mounted on said shaft $c^3$, yet restrained from longitudinal movement thereon, which is engaged by a pawl $d'$, carried by a pawl carrying arm $d^2$, loosely mounted on said shaft, the outer end of which is connected by a link $d^3$, with a hand lever $b^3$, so that as the hand lever is depressed the said pawl carrying arm will in turn be moved to cause the pawl to engage the next tooth of the ratchet wheel, and when said hand lever is raised the ratchet wheel will be advanced. A disk or collar $e$, is splined on the shaft $c^3$, being thereby movable longitudinally, but when turned rotates the shaft, and a spring $e'$, which encircles the shaft $c^3$, bears against and presses said disk $e$, against the ratchet wheel $d$, with considerable force.

The rack bar $c'$, worm $c^2$, shaft $c^3$, loose ratchet wheel $d$, pawl $d'$, and pawl carrying arm $d^2$, and the spring pressed disk or collar $e$ splined on said shaft, and bearing frictionally against said ratchet wheel constitute the frictional or slip feeding mechanism for the follower or plunger, whereby it may be advanced intermittingly irregular distances. The material to be cut having been placed in the receiver, the plunger presses it against the knife carrying frame, and if the material which is brought into contact with said knife carrying frame is soft such as gristle or meat, it will be forced more or less through the clearance-slots, and when the knives are depressed, a certain quantity of the material is removed, whereas if the material which is brought into contact with said knife carrying frame is hard, as exceedingly hard bone for instance, which will not be forced into or through the clearance-slots, then when the knives are depressed a smaller quantity of material will be removed. As the quantity of material removed by the knives thus varies according as the material is hard or soft, the distances which the plunger or follower travels at each operation of the knives correspondingly varies. The ratchet wheel $d$, will be moved a definite distance each time the hand lever is lifted, and owing to the frictional resistance between said ratchet wheel and disk $e$, the latter will be correspondingly moved, but if said material is hard the distance which the plunger travels will be less, and hence the disk $e$, will turn with said ratchet wheel until the power required to further advance the plunger becomes greater than or overcomes the frictional resistance, then in such case the ratchet wheel will slip by or over the collar $e$, without further rotating it. Hence it will be seen that the follower or plunger is moved intermittingly irregular distances according to the varying hardness of the material which is being cut.

I claim—

1. In a bone cutting machine, the combination of a bone receiver, open at one end, a knife carrying frame movable vertically across said open end, having one or more knives and clearance-slots, and a hand lever for moving said knife carrying frame, a follower in said bone receiver, and frictional or slip feeding mechanism for advancing it intermittingly irregular distances, one of the co-operating parts or members of which is connected with and operated intermittingly but positively by said hand lever, and is in frictional engagement with other co-operating parts of said feeding mechanism, substantially as described.

2. In a bone cutting machine, the combination of a bone receiver, open at one end, a knife carrying frame movable vertically across said open end having one or more knives and clearance-slots, a hand lever for moving said knife carrying frame, a follower contained in said bone receiver, and frictional or slip feeding mechanism therefor, consisting of the rack bar $c'$, worm $c^2$, shaft $c^3$, loose ratchet wheel $d$, thereon, pawl $d'$, and pawl carrying arm $d^2$, and link connecting it with said lever, and the spring pressed disk or collar $e$, splined on said shaft and bearing frictionally against said ratchet wheel, substantially as described.

In testimony whereof I have signed my name to this specification in the presence of two subscribing witnesses.

JAMES L. LILLEY.

Witnesses:
JESSE A. TAFT,
JOHN J. HENNESSEY.